United States Patent
Chen

(10) Patent No.: US 8,535,470 B2
(45) Date of Patent: *Sep. 17, 2013

(54) MOLD FOR SHAPING BASEBALL OR SOFTBALL

(76) Inventor: Shyi-Ming Chen, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/186,971

(22) Filed: Jul. 20, 2011

(65) Prior Publication Data

US 2012/0241080 A1    Sep. 27, 2012

(30) Foreign Application Priority Data

Mar. 25, 2011    (CN) .......................... 2011 1 0073873

(51) Int. Cl.
*B29C 65/02*    (2006.01)
*B32B 7/08*    (2006.01)

(52) U.S. Cl.
USPC .............................. 156/242; 156/93; 156/381

(58) Field of Classification Search
USPC .......................................................... 156/242
See application file for complete search history.

(56) References Cited

U.S. PATENT DOCUMENTS

| | | | |
|---|---|---|---|
| 2,388,776 A * | 11/1945 | Wallace | 264/225 |
| 4,154,789 A * | 5/1979 | Delacoste | 264/138 |
| 4,808,272 A * | 2/1989 | Molitor | 205/70 |
| 6,045,665 A * | 4/2000 | Ohhashi et al. | 204/192.12 |

* cited by examiner

*Primary Examiner* — Philip Tucker
*Assistant Examiner* — Vicki Wu
(74) *Attorney, Agent, or Firm* — Chun-Ming Shih

(57) ABSTRACT

A mold for shaping a baseball or softball is constructed from two identical figure of 8 shaped mold pieces which correspond to an outside shape of a ball. The two mold pieces are made from flexible materials such as rubber, silicone or plastic resin, fit onto each other to form the outside shape of the ball. Joining areas of the two mold pieces have joining edges, and on inside sides of the joining edges on interior surfaces of the two mold pieces grooves are set which form a raised sewn section on a surface of the ball cover, and a material inlet and air outlet are formed where the two mold pieces join.

1 Claim, 5 Drawing Sheets

MOLD FOR SHAPING BASEBALL OR SOFTBALL

BACKGROUND OF THE INVENTION

1. Field of the Invention

The present invention relates to the production process of a baseball or softball, in particular, to a mold for shaping a baseball or softball and the shaping method thereof.

2. Description of Related Art

Currently in the construction of formal competition baseballs and softballs, the main part is the ball core and ball cover which is constructed with an inner core covered by an outer leather cover. As shown in FIG. 1, the outer cover is made from two figure of 8 shaped covers (A) which join at the seams and cover the ball core B to form the ball, and where the seams of the opposing outer covers join, they are sewn together to form a raised sewn section thus fulfilling the outward appearance requirements of a softball or baseball, this raised sewn section usually being hand-sewn which requires a high operational ability. In the current market where worker costs continue to increase, this inevitably leads to higher production costs.

Additionally, the source of leather for the leather covers is limited and the cost of leather is increasing, making it difficult to lower production costs and therefore, difficult to increase competitiveness in the market for this product.

Furthermore, during the use of the ball, where the outer covers are sewn together at the seams and cover the ball core, the ball is vulnerable to the environment, for example, when the weather is humid or rainy; moisture or water enters through these seams of the ball cover and soaks the ball core. This soaking of the ball core results in a heavier ball, leading to a loosening of the ball core and a change of shape which influences the elasticity and physical properties of the ball. There is therefore, an inability to ensure the original physical characteristics of the ball, which greatly shortens the lifespan of the ball.

For the abovementioned reasons, PU material is conveniently used as the ball cover, as in FIG. 2, more specifically, two opposing semi circular shaped mold pieces 1', 2' fit onto each other to form the ball cover on the ball core, this process resulting in mechanized production of the ball to reduce worker and production costs, and the PU material replacing leather to reduce material costs, and at the same time producing a tighter fitting ball which doesn't allow water to enter. But because of the shape of the semi circular shaped mold pieces, after production a line 3' will appear where the molds join, which still requires a worker to trim the ball to achieve the required outside shape of the ball cover and therefore the manufacturing process still has minor problems.

The current method of covering the ball core with a ball cover results in the ball cover and ball core not being tight fitting and not being well integrated, and it is easy for the ball cover to separate from the ball core, thereby influencing the characteristics of the ball.

SUMMARY OF THE INVENTION

The goal of this invention is to provide a softball and baseball shaping method which lowers production costs, and with simplified additional work procedures, as well as making the ball core and ball cover being tighter fitting and better integrated, and ensuring functional use of the ball.

To realize the abovementioned goals, this invention solves the drawbacks by providing a kind of mold to shape a baseball or softball, more specifically, the mold being constructed from two soft figure of 8 shaped mold pieces which correspond to the outside shape of a ball cover, the joining areas of the two mold pieces having joining edges, and on the inside sides of the joining edges on the interior surfaces of the two mold pieces grooves are set which forms the raised sewn section on the surface of the ball cover, and a material inlet and air outlet are formed where the two mold pieces join.

A kind of baseball or softball shaping method, has the following steps:

(1) firstly two constructed figure of 8 shaped soft mold pieces corresponding to an outside shape of a ball cover fitting onto each other to form a mold cavity of a mold;

(2) thereafter fluid PU material being placed in the mold cavity of the mold, and then a material inlet being plugged by a plug before shaking of the mold proceeds to allow the PU material to be evenly distributed and harden on an interior walls of the mold cavity to become a ball cover of the ball, and at the same time the ball cover forming a cavity for a ball core;

(3) thereafter the plug being removed and ball core material being injected into the cavity of the ball cover which hardens, thereby completing an integration of the ball core and the ball cover; and 4) finally the mold being removed to reveal a complete shaped ball.

The above mentioned step utilizes PU material for the ball core.

After step (4) of the above, the formed raised sewn section is spray painted, to color the raised sewn section as required.

After using the above method, this invention forms the complete shaped ball and ball cavity through the joining of the two mold pieces, and the soft molds are easy to remove, moreover the formed raised sewn section found on the surface of the ball cover is formed along where the two figure of 8 mold pieces join, thereby eliminating the need to trim the ball to achieve the required outside shape of the ball, this shaped mold cover being easily constructed, and designed to exact standards, allowing for easy shaping of the ball cover, and a simplified work process, greatly increasing the production rate of baseballs or softballs; additionally, the method of first forming the mold cover then forming the ball core, allows for tighter fitting and better integration of the ball core and ball cover, thereby ensuring the physical characteristics and properties of the ball.

The invention, as well as its many advantages, may be further understood by the following detailed description and drawings in which:

DETAILED DESCRIPTION OF THE INVENTION

Figure 1:
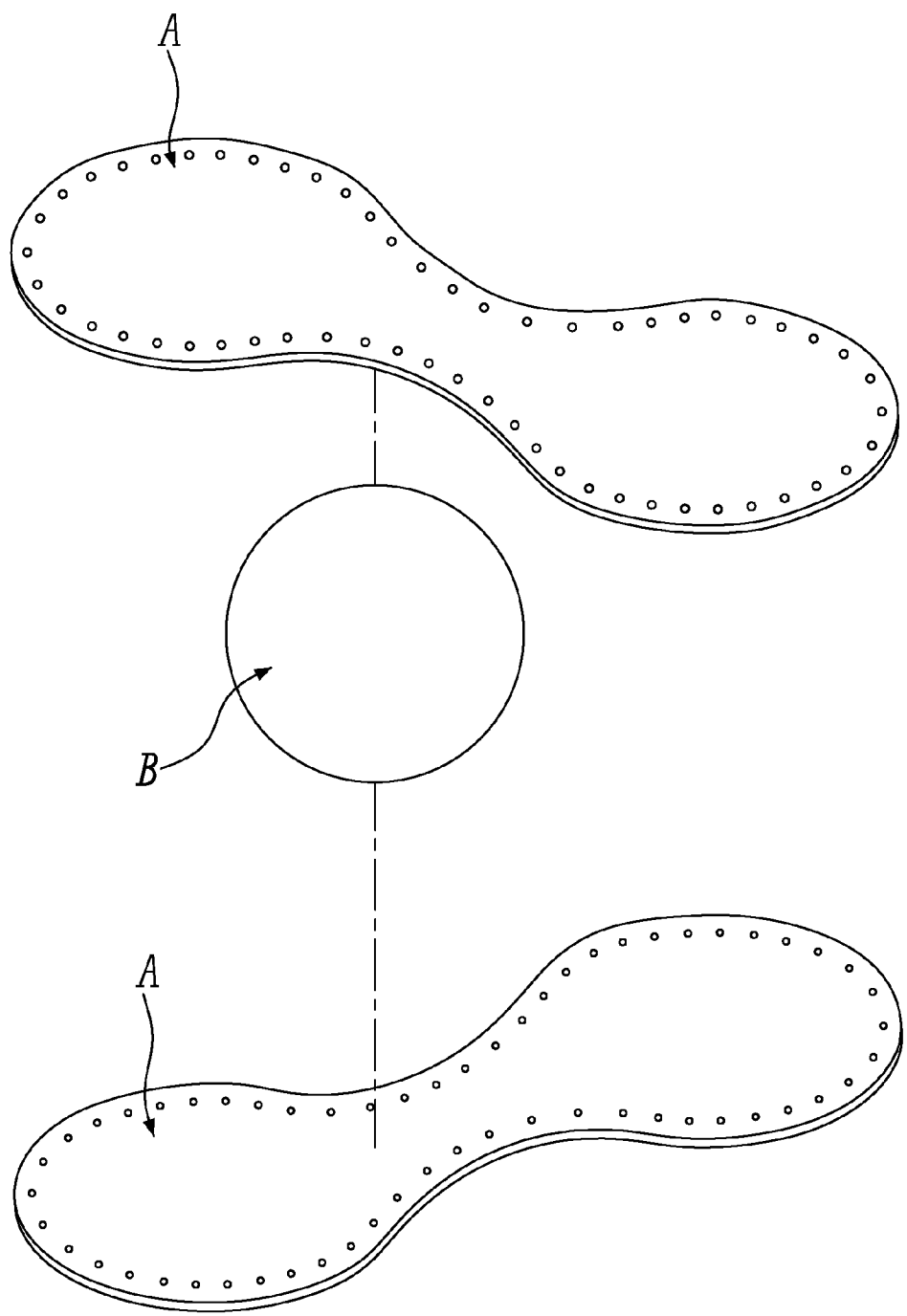
FIG. 1 is an exploded perspective view of a prior art baseball or softball.
Figure 2:
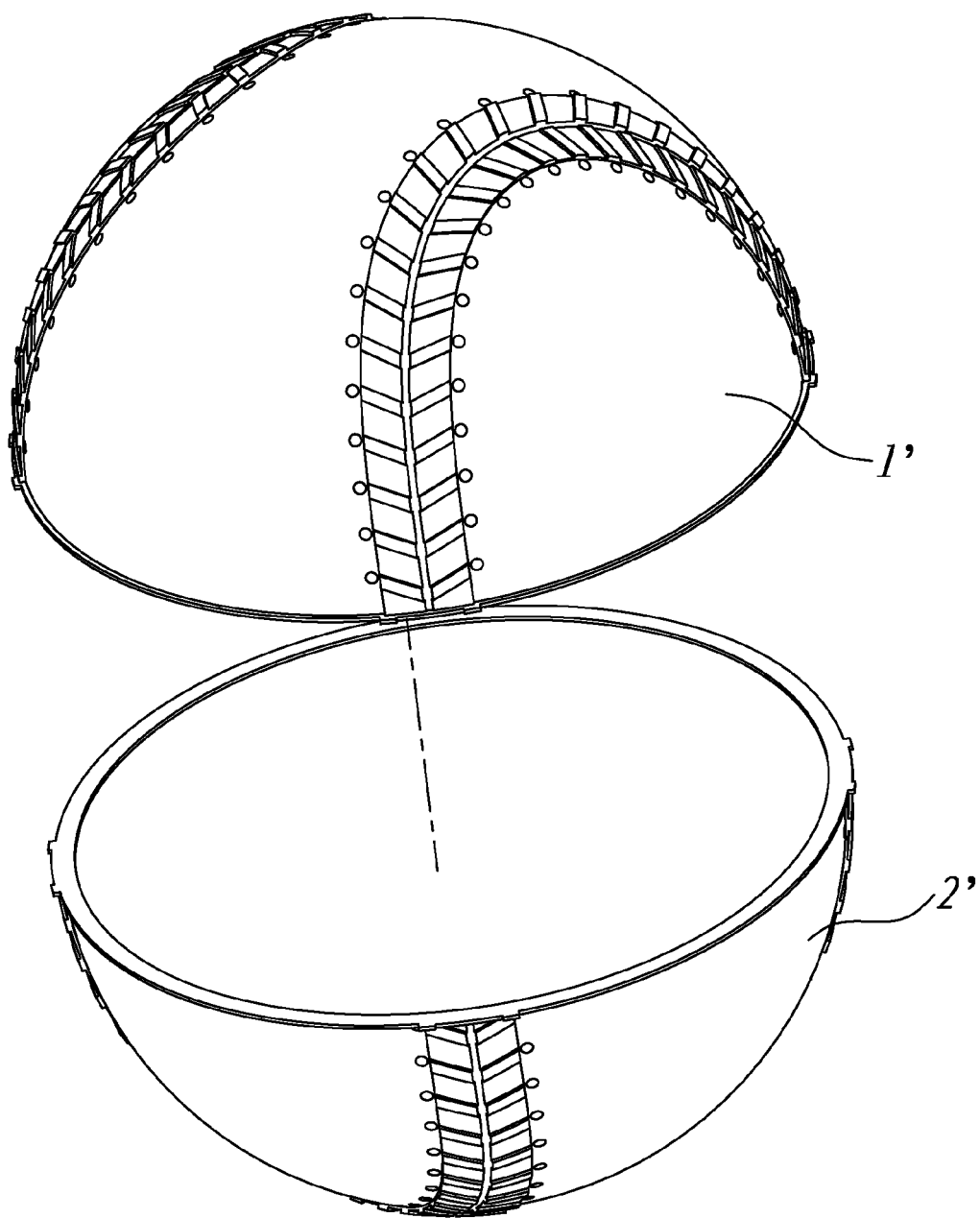
FIG. 2 is a schematic diagram showing the ball cover shaping of a prior art baseball and softball.
Figure 3:
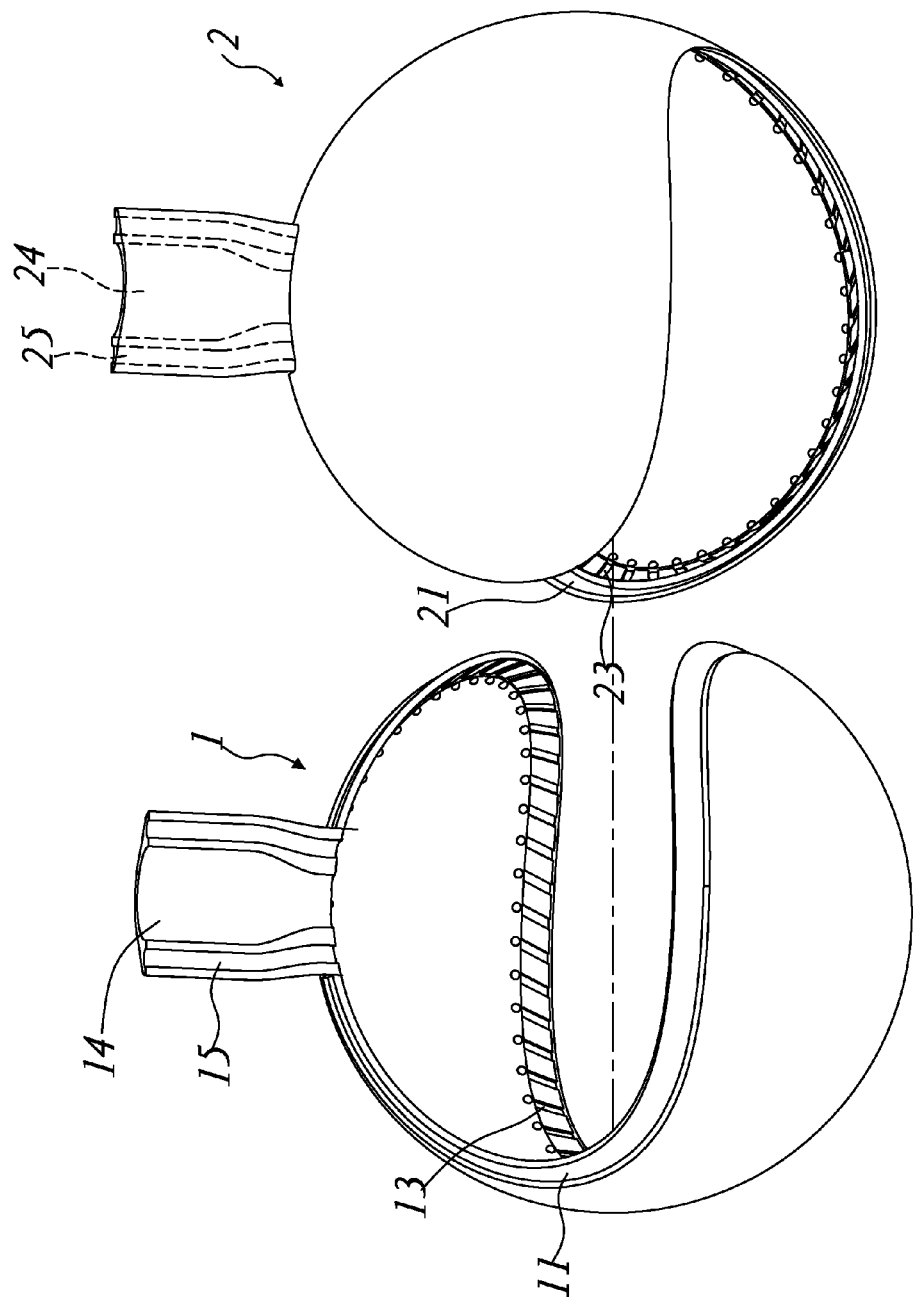
FIG. 3 is a schematic diagram showing the mold structure of the present invention.
Figure 4:
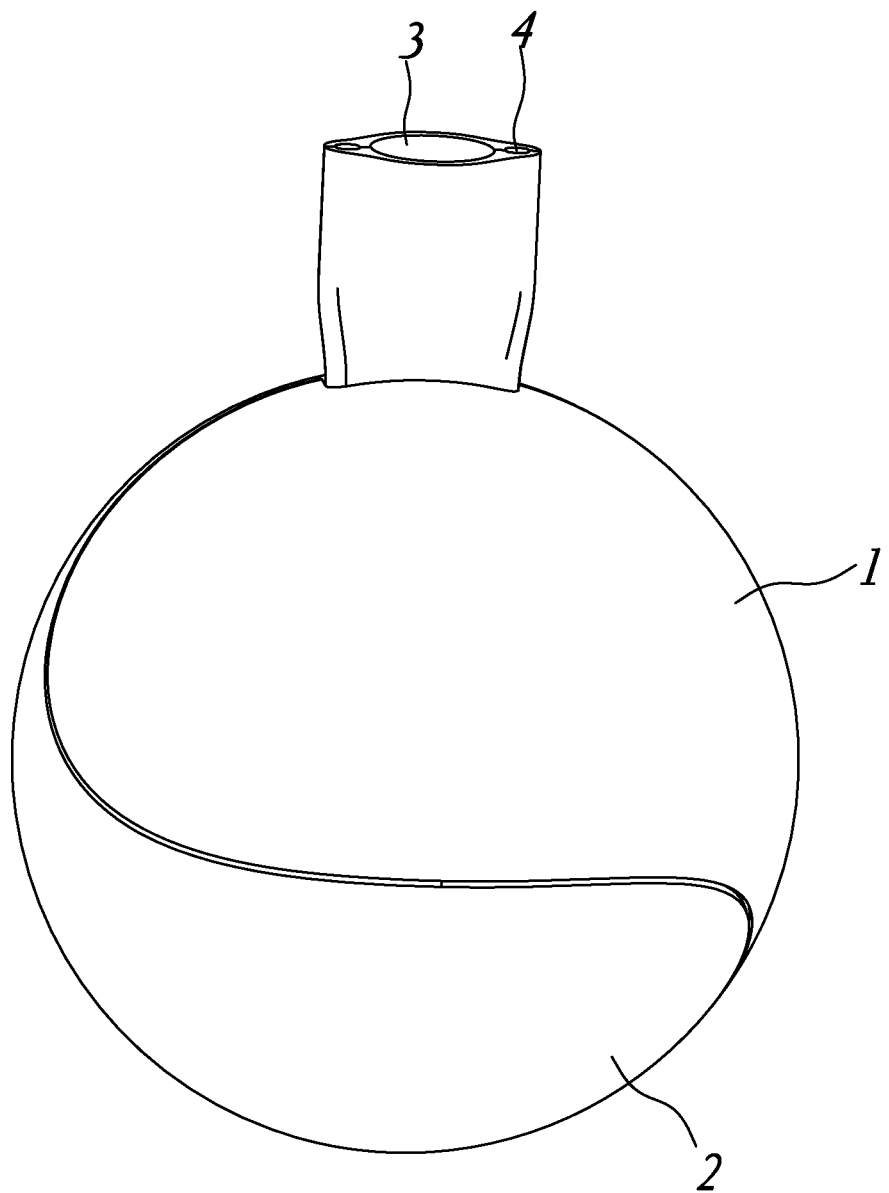
FIG. 4 is a schematic diagram showing the embodiment of the mold of the present invention.

As shown in FIG. 3 and FIG. 4, this invention discloses a mold for shaping and the shaping method of a softball or baseball, this mold being constructed from two soft figure of 8 shaped mold pieces 1, 2 which correspond to the outside shape of a ball cover, these two mold pieces 1, 2 joining together to form the outside shape of the ball, these 2 mold pieces 1, 2 having improved changeable properties, for example the mold pieces 1, 2 can be made from rubber, silicone or soft resin.

The outer surface of the boundary of the above described mold piece 1 has a formed stepped surface, and has a joining edge 11 where it joins mold piece 2; on the inside side of the inner surface of this joining edge 11 grooves 13 are set which form the raised sewn section on a ball cover; on the joining edge 11 of this mold piece 1, a protrusion is set on joining edge 11 having a material inlet groove 14 which connects to an inside side of mold piece 1, and on two sides of material inlet groove 14 air outlet grooves 15 are set which connect to the inside side of mold piece 1.

On the inner surface of the boundary of mold piece 2 a stepped surface is formed, having a similar thickness but formed opposite to the stepped surface on mold piece 1, these stepped surfaces being joining edge 11 on mold piece 1 which joins together with the stepped surface on joining edge 21 on mold piece 2; on the inside side of the interior surface of joining edge 21 grooves 23 are set which form the raised sewn section on a ball cover; the joining edge 21 of mold piece 2 corresponds to the above described material inlet groove 14 and the protrusion, the protrusion having material inlet groove 24 which connects to an inside side of mold piece 2, and on both sides of material inlet groove 24 are air outlet grooves 25 which connect to the inside side of mold piece 2;

As shown in FIG. 4, the two mold pieces 1 and 2 join together to form the cavity of a complete ball, at the same time the material inlet grooves 14 and 24 fit together to form material inlet 3, and the two air outlet grooves 15 and 25 fit together to form two air outlets on two sides of material inlet 3.

Figure 5:
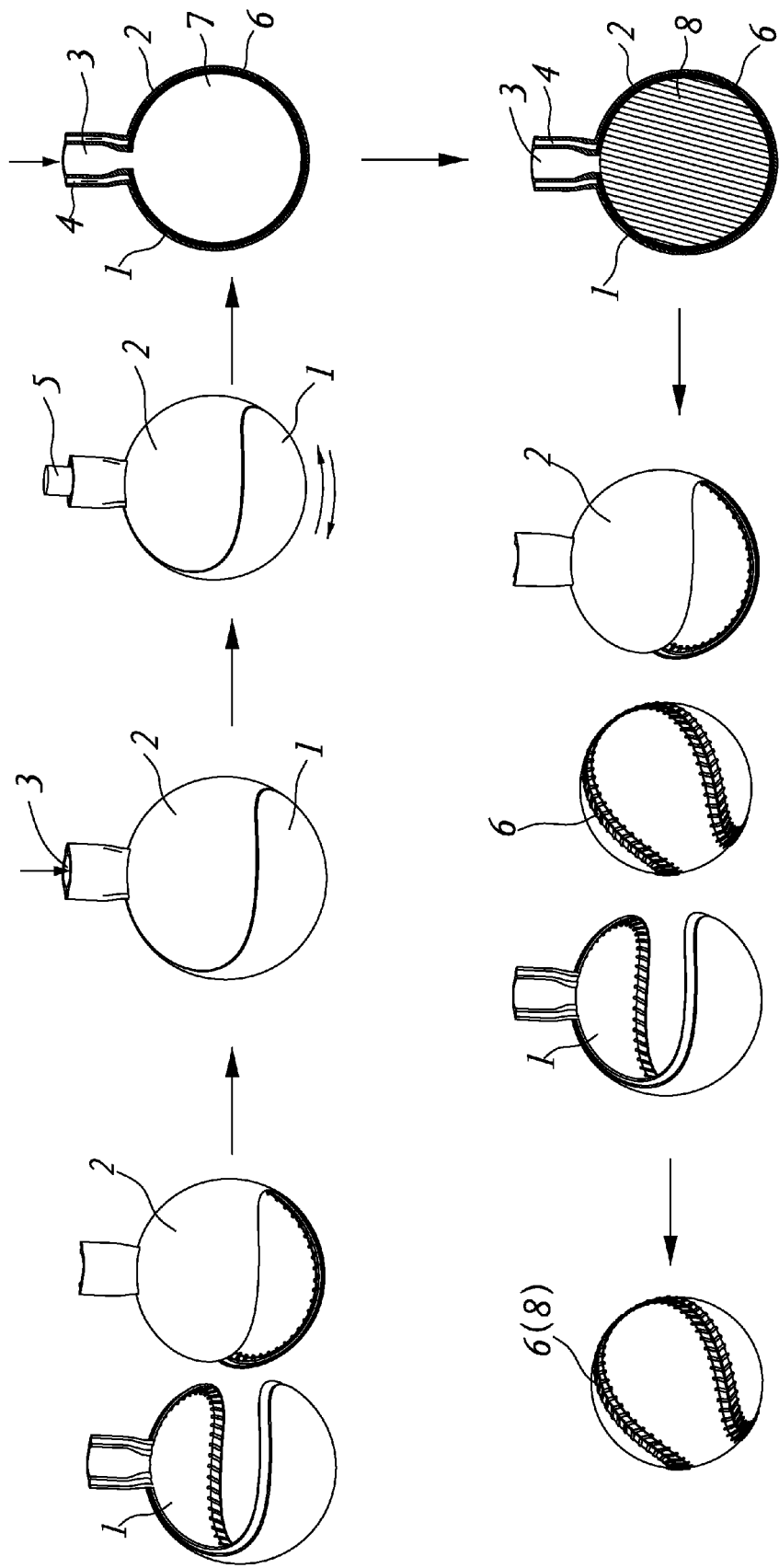
FIG. 5 is a diagram showing the shaping process of the present invention.

Together with FIG. 5 the method for utilizing the mold described above and shaping the softball or baseball can be described as follows.

Firstly, the two soft corresponding figure of "8" shaped mold pieces 1, 2 which correspond to the outside shape of a ball cover are produced, and are joined together to form a mold cavity of the mold;

thereafter, fluid PU material is poured into the mold cavity of the mold, and after the material inlet 3 of the mold is plugged by a plug 5, the mold is shaken to allow the PU material to be evenly distributed and harden on the inside walls of the mold cavity thus forming the ball cover 6 of the ball, at the same time the interior of the ball cover 6 forms an interior cavity 7 for the ball core, and when ball cover 6 is being formed, air outlets 4 function as air exhausts to ensure balanced pressure inside the mold;

thereafter, the plug 5 is removed and ball core material is injected into the interior cavity 7 of the ball cover which proceeds to harden, PU material is used in this instance for the ball core, but other material having elastic or rigid properties can be used, thereby completing the integration of the ball cover 6 and ball core 8. Lastly, the mold is removed to reveal the complete ball;

to enable a better ball cover appearance, the areas around the edges of the material inlet on the surface of the ball cover are trimmed and the formed raised sewn section is spray painted the required colors.

Using the mold of this invention and this production method for producing baseballs and softballs, through two joining mold pieces joining to form a complete ball and cavity, and the soft mold pieces being easily removed, moreover the sewn section grooves set where the two figure of 8 mold pieces join and form the raised sewn section found on a ball cover where the two ball covers are sewn together to achieve the required outside appearance of the ball, and the raised sewn section is formed along the join lines thereby eliminating the need to trim the ball to achieve the required outside appearance of the ball, and the mold having a simple structure and designed to exact specifications allows for easy shaping of the ball additional work procedures much simplified and greatly increases the production rate of softballs and baseballs; Additionally, the method of first shaping the ball cover then the ball core allows for a ball core and ball cover which is better integrated and tighter fitting, thereby ensuring the physical characteristics and properties of the ball.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A mold for shaping a baseball or softball, characterized in that: the mold is constructed from two identical figure of 8 shaped mold pieces which correspond to an outside shape of a ball, the two mold pieces being made from rubber, silicone or resin, fit onto each other to form the outside shape of the ball, the two mold pieces having two joining edges respectively joined to each other, an outer side at one joining edge formed with a stepped surface to engage with another stepped surface formed on an inside side at the other joining edge, and on interior surfaces of the two mold pieces grooves are set respectively along the two joining edges to form a raised sewn section on a surface of a molded ball cover so that a mold line on the molded ball cover formed by two mold pieces after demoulding is exactly located on the raised sewn section, and a material inlet and air outlet are formed where the two mold pieces join.

* * * * *